Feb. 28, 1928.
E. L. DELANY
FLOAT VALVE FOR FLUSH TANKS
Filed Feb. 2, 1926
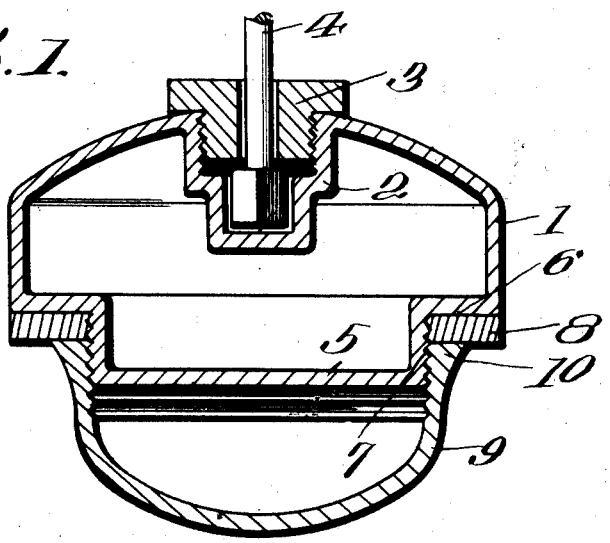
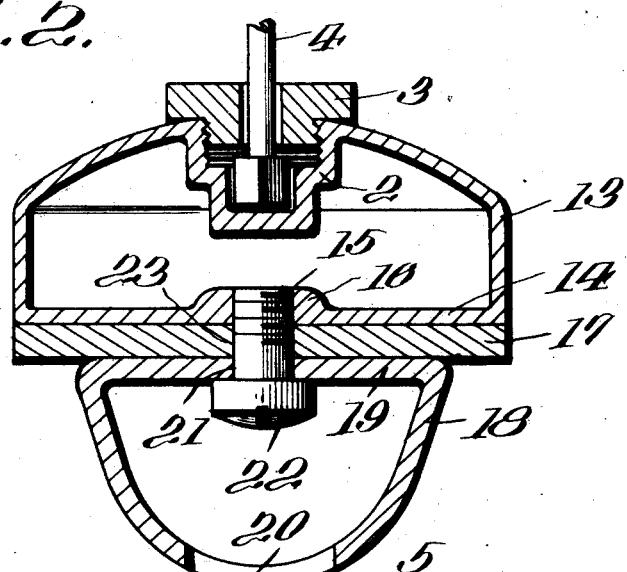
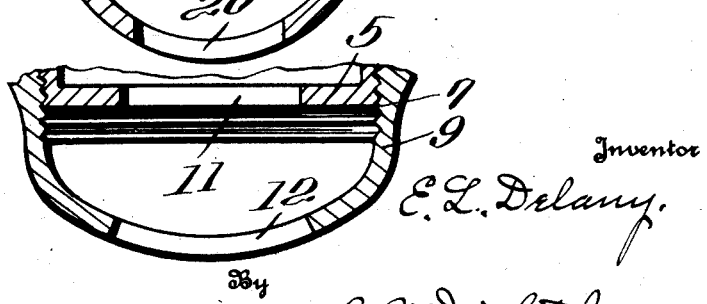

Feb. 28, 1928.

E. L. DELANY 1,661,112

FLOAT VALVE FOR FLUSH TANKS

Filed Feb. 2, 1926  2 Sheets-Sheet 2

Inventor
Edward L. Delany.
By C. R. Wright, Jr.
Attorney

Patented Feb. 28, 1928.

1,661,112

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

FLOAT VALVE FOR FLUSH TANKS.

Application filed February 2, 1926. Serial No. 85,515.

My invention relates to improvements in float valves for flush tanks.

The object of my invention is to provide a composition float valve for flush tanks or other purposes in which the same is made of hard rubber or other compositions, and provided with a horizontally arranged removable seating surface made of soft rubber, leather, or other soft material adapted to cooperate with the valve seat so that a smaller seating surface is required, and at the same time insure of the perfect seating of the valve to prevent the leakage of water therearound.

Another object of my invention is to provide a float valve of this character made in two sections and secured together, and in which the soft seating portion is held in its proper position between the two sections and forming a proper abutment for the soft seating surface.

A further object of my invention is to provide a simple, cheap and effective flush valve float of this character having certain details of structure and combination of parts hereinafter more fully set forth.

In the accompanying drawings:—

Figure 1 is a vertical sectional view of my improved flush valve float.

Figure 2 is a vertical sectional view similar to Figure 1 showing a modified form of float embodying the invention.

Figure 3 is a vertical sectional view of the lower end of the float shown in Figure 1, showing the two sections provided with openings.

Figure 4:
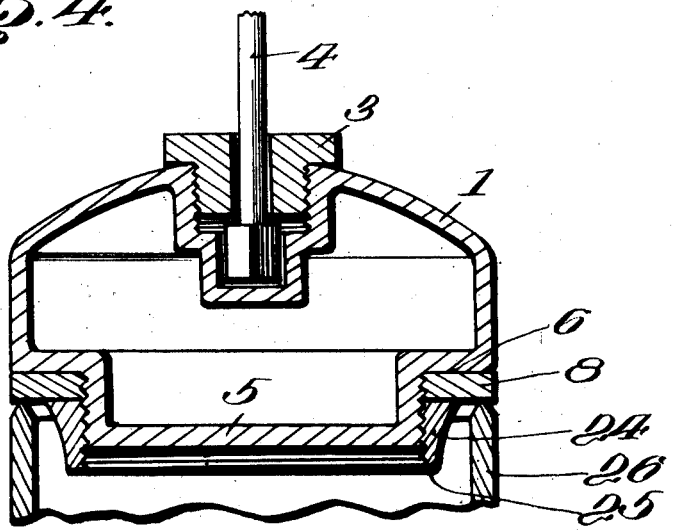
Figure 4 is a vertical sectional view of a modification of Figure 1.

Referring now to the drawings, 1 represents the main body portion of my improved float, which can be made of any desired composition but preferably of hard rubber, and which has, at its upper end, the inwardly depressed portion 2, adapted to receive the cap 3, by means of which the lifting rod 4 is removably attached thereto, all of which is fully shown and described in my copending application Serial No. 59,360, filed September 29, 1925, and therefore needs no further description. The body portion 1, as shown, is of a hollow form and has a contracted lower end 5, forming a horizontal circumferential shoulder 6 therearound, and the contracted portion 5 is externally threaded as indicated at 7.

Surrounding the lower end 5 of the main body portion and resting against the shoulder 6 is a soft seating surface 8, which may be made of soft rubber or any other soft material adapted for the purpose. Screwed upon the threaded portion 7 of the contracted portion 5 of the main body portion of the float is the guide portion 9, which has its upper end slightly thickened at 10 to form a broad bearing surface to engage the soft seating surface 8. By this structure it will be seen that the soft seating surface is tightly clamped against the shoulder 6 of the main body portion 1, and can be readily removed by the removal of the guide portion 9.

In Figure 3, I have shown the contracted portion 5 of the main body portion 1 provided with an opening 11, and the guide 9 has its lower end provided with an opening 12. This allows of the discharge of any water that may leak into the valve and water is prevented from entering the same by the air pressure therein, all of which is well understood and needs no further description.

In the modification shown in Figure 2 of the drawings, the body portion 13 has its upper end constructed the same as that shown in Figure 1, and like reference numerals indicate like parts, therefore, a detail description of the same is not necessary. In this modification the lower end of the body portion 13 is perfectly flat as indicated at 14, and is provided at its center with the threaded opening 15 around which is arranged a boss 16, whereby a longer threaded portion is provided. The soft seating surface 17 is made of a disk form, and of a size to extend out in a vertical plane with the outer face of the body portion 13. Below the seating surface is arranged the guide portion 18, which is of hollow form having its lower end of a shape constructed to guide the valve within the seat, and its upper end perfectly flat as indicated at 19. The lower end of the guide is provided with an opening 20 and the horizontal upper end 19 of the guide 18 is provided with an opening 21 through which passes the screw 22, which also passes through an opening 23 in the soft seating surface 17, and which is screwed into the threaded opening 15 in the lower flat horizontal portion 14 of the main body portion.

By the structure shown in Figure 2 it will be seen that a screw driver can be inserted through the opening 20 in the guide 18, for inserting or removing the screw 22. It will be seen that the flat horizontal portion 19 of the guide 18 firmly clamps the soft seating surface 17 against the horizontal lower end 14 of the body portion, leaving the ring like portion beyond the guide which is adapted to cooperate with the valve seat, all of which is well understood by those skilled in the art.

In Figure 4 I have shown the main body portion 1 constructed precisely like that shown in Figure 1 of the drawings, and instead of having the guide portion 9 of a hollow form and extending downwardly I have provided a ring 24 which terminates at 25, a short distance below the contracted lower end 5 of the main body portion. This ring is internally threaded and screwed on the contracted portion 5, as clearly shown in the drawings. The valve seat 26 assumes the position on the soft rubber seating surface.

Figure 5:
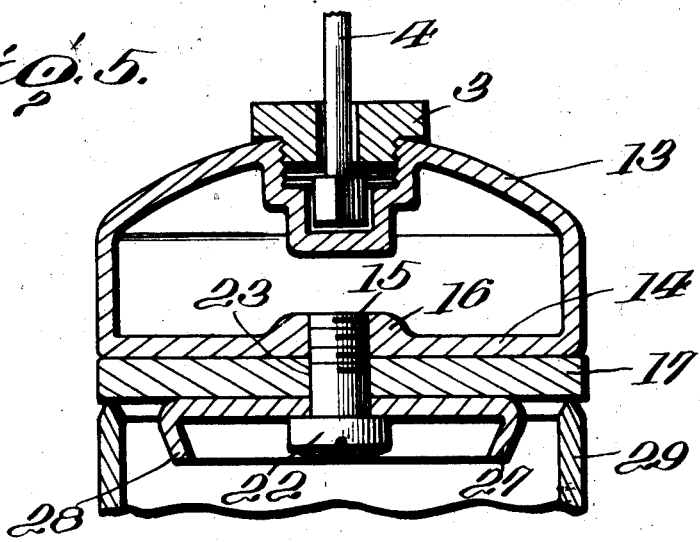
Figure 5 is a vertical sectional view of a modification of Figure 2.

In the modification shown in Figure 5, the main body portion 13 is constructed precisely like that shown in Figure 2 of the drawings and like reference numerals indicate like parts. In the modification shown in Figure 5, the guide portion 27 is secured to the body portion by the screw 22 clamping the soft seating surface 17 to the main body portion the same as that shown in Figure 2 of the drawings. The guide portion 27 terminates at 28 at a point slightly below the head of the screw 22. The valve seat 29 assumes the position shown in the drawings.

Having thus fully described my invention what I claim is:—

1. A flush valve float comprising a hollow closed body portion having a horizontal surface, a soft seating washer resting against the horizontal surface, and a guide secured to the body portion and clamping the soft washer to the horizontal surface of the body portion and extending downwardly below the body portion and leaving a narrow annular portion of the washer exposed.

2. A flush valve float comprising a hollow closed body portion having a horizontal surface above its lower end, a soft seating washer resting against the horizontal surface, and a guide secured to the body portion and clamping the washer to the horizontal surface of the body portion, and extending a considerable distance below the lower end of the body portion and leaving a narrow annular portion of the washer exposed.

3. A flush valve float comprising a hollow closed body portion having a reduced lower end forming a flat horizontal surface, a soft seating washer resting against the horizontal surface, and a guide secured on the reduced portion of the body and clamping the washer to the horizontal surface and extending a considerable distance below the body portion and leaving an annular portion of the washer exposed.

4. A flush valve float comprising a hollow closed body portion having a reduced externally threaded portion at its lower end forming a horizontal surface, a soft washer resting against the horizontal surface, and a tapering guide screwed on the threaded reduced portion of the body portion and clamping the soft gasket to the horizontal surface and extending a considerable distance below the lower end of the body portion and leaving the narrow annular portion of the washer exposed.

5. A flush valve float comprising a hollow closed body portion having a reduced externally threaded lower end forming a horizontal surface, a soft washer resting against the horizontal surface and having its outer periphery flush with the periphery of the body portion, a tapering guide screwed on the reduced portion of the body portion and clamping the washer against the horizontal surface, and extending a considerable distance below the body portion and leaving a narrow annular portion of the washer exposed.

6. A flush valve float comprising a hollow closed body portion having a reduced externally threaded portion at its lower end forming a horizontal surface, a soft washer resting against the horizontal surface, and a closed tapering guide screwed on the reduced portion and clamping the washer to the horizontal surface and extending a considerable distance below the body portion and leaving the annular portion of the washer exposed.

7. A flush valve float comprising a hollow body portion having a horizontal surface, a soft seating washer resting against the horizontal surface, and a guide secured to the body portion, and covering a greater portion of the lower end of the body portion, and clamping the washer to the horizontal surface and extending down below the body portion leaving a narrow annular portion of the washer exposed, forming a horizontal flat seating surface for the valve seat.

8. A flush valve float comprising a hollow body portion having a horizontal surface, a soft seating washer resting against the horizontal surface, and a guide secured to the body portion and covering a greater portion of the lower end of the body portion and clamping the washer thereto and having a downwardly tapered portion and leaving a narrow annular portion of the washer exposed forming a flat horizontal seating surface for the valve seat.

9. A flush valve float comprising a hollow body portion having a reduced externally threaded portion at its lower end forming a horizontal surface, a soft washer resting against the horizontal surface, and a guide screwed on the threaded reduced portion of the body portion, and clamping the soft washer to the horizontal surface, and extending a considerable distance below the lower end of the body portion and tapering inwardly and leaving a narrow annular portion of the washer exposed forming a narrow flat horizontal seating surface for the valve seat.

10. A flush valve float comprising a hollow body portion having a reduced externally threaded portion at its lower end forming a horizontal surface, a soft washer resting against the horizontal surface, and a guide screwed on the threaded reduced portion of the body portion and clamping the soft washer to the horizontal surface, and having a downwardly extending tapering portion of a diameter slightly less than the valve seat, and leaving a narrow annular portion of the washer exposed forming a horizontal flat seating surface for the valve seat.

In testimony whereof, I affix my signature.

EDWARD L. DELANY.